United States Patent [19]

Ballard

[11] Patent Number: 4,992,515

[45] Date of Patent: Feb. 12, 1991

[54] NYLON TERPOLYMER CROSSLINKED WITH MELAMINE FORMALDEHYDE FOR COATING SEWING THREADS

[75] Inventor: Larry Ballard, Columbia, S.C.

[73] Assignee: Shakespeare Company, Columbia, S.C.

[21] Appl. No.: 462,630

[22] Filed: Jan. 9, 1990

[51] Int. Cl.[5] .................... C08L 61/20; C08L 77/00; C08F 283/00; C08G 8/28
[52] U.S. Cl. .................... 525/428; 525/427; 525/420; 525/419; 525/412; 525/549; 525/519
[58] Field of Search .................... 525/428; 528/314

[56] References Cited

U.S. PATENT DOCUMENTS 3,823,031  7/1974  Tsukamoto .................... 117/138.8

FOREIGN PATENT DOCUMENTS 2439918  3/1975  Fed. Rep. of Germany ...... 525/428
994617   6/1965  United Kingdom ................ 525/428

OTHER PUBLICATIONS

Brochure–Dupont Elvamide, Nylon Multipolymer Resins, p. 6.
Brochure–Elvamide Nylon Multipolymer Resins for Thread Bonding.

*Primary Examiner*—John C. Bleutge
*Assistant Examiner*—W. R. H. Clark
*Attorney, Agent, or Firm*—Renner, Kenner, Greive, Bobak, Taylor & Weber

[57] ABSTRACT

A cross-linkable nylon composition and is useful for coated sewing threads. The compositions comprises a nylon terpolymer; from about 1 to 20 percent by weight of a low residual formaldehyde cross-linkable resin, based upon the weight of the terpolymer; from about 0.1 to 10 percent by weight of a catalyst for the cross-linkable resin, based upon the weight therof and a suitable solvent for the terpolymer in an amount sufficient to form at least a 5 percent solution by weight of the terpolymer. Coated sewing threads comprise a sewing thread and from about 0.1 to 20 percent by weight of the cross-linked nylon composition, based upon the weight of the thread.

6 Claims, No Drawings

NYLON TERPOLYMER CROSSLINKED WITH MELAMINE FORMALDEHYDE FOR COATING SEWING THREADS

TECHNICAL FIELD

The present invention is directed toward cross-linkable polymer compositions and continuous multifilament sewing thread coated therewith. Multifilament sewing thread for industrial applications, such as in the furniture and automotive industries, is subjected to considerable abrasion during the sewing operation. Polymeric coatings are used to protect the thread during the sewing and prevent abrasion of the thread itself.

BACKGROUND OF THE INVENTION

Sewing thread has been typically coated with monomeric substances to aid in sewing, and to protect the thread. These coatings, or finishes, include such materials as silicones, fatty acid derivatives and phosphate esters. In the case of heavy industrial sewing, such monomeric coatings do not provide sufficient protection and, accordingly, polymer coatings have been used.

In addition to abrasion resistance, polymeric coatings provide actual bonding of the individual strands of the thread. This bonding provides a smoother thread surface and allows the thread to pass easily through the eye of the sewing needle. In addition, bonding allows thread to be made of filament bundles having lower levels of twist. Lower levels of twist result in lower costs for thread.

A particularly useful class of polymeric coatings which provides abrasion resistance as well as bonding are the nylon terpolymers. These terpolymers are readily soluble in lower alcohols. The coating technique is generally practiced by passing the thread through an alcohol solution of the terpolymer and subsequently removing the solvent by heat. Threads coated with these nylon terpolymers are highly resistant to abrasion, are well bonded and are suitable for many sewing applications.

In more demanding sewing applications, ordinary polymeric coatings may not meet the stringent requirements for a bonded thread. High speed sewing into heavy material, for instance, may result in fibrillation of bonded thread so that individual strands which may make up the bonded bundle of thread can separate when the thread is subject to sewing stresses. This fibrillation results in poor stitches and is generally unacceptable.

In order to improve the bond strength, a cross-linkable bonding agent has been used heretofore for thread coating. Cross-linking improves the thread to binder adhesion as well as the bulk strength of the bonding material itself. A suitable cross-linking system makes use of "type-8" nylon which is an alkoxyalkylated nylon 66. Type-8 nylons, which are dissolved in suitable solvents, are applied to thread in the manner described hereinabove. Cross-linking of the "type-8" nylon is catalyzed by a suitable acid and takes place as the solvent is removed from the polymer coating. Nevertheless, the manufacture of "type-8" nylon resins is complex and expensive. This drawback has hindered the development of threads with a cross-linked coating.

In addition to using "type-8" nylon, cross-linking of nylon terpolymers has been achieved by the use of epoxy resins, phenol formaldehyde resins and melamine formaldehyde resins. These resins, in solutions with the nylon terpolymers, react with the terpolymers at elevated temperatures. The effect is to cross-link the nylon resin which results in a harder, more durable thread coating.

While the epoxy resins result in highly cross-linked coatings, they require longer cure times than either the "type-8" nylon or the phenol formaldehyde or melamine formaldehyde resins. Longer cure times result in slower coating rates and at times, tacky, uncured coatings. Phenol formaldehyde resins and melamine formaldehyde resins result in highly cross-linked coatings and the curing takes place in a timely manner. However because of residual formaldehyde in these resin formulations, environmental concerns have been raised so that there has been an understandable reluctance to use this system in coating applications.

Another means for minimizing breakage of multifilament sewing threads is provided in U.S. Pat. No. 3,823,031, which describes the use of a thermoplastic segmented copolyester elastomer as a bonding agent coating for nylon and polyester multifilament threads. By bonding together the individual filaments, untwisting is minimized which helps to eliminate breakage.

DISCLOSURE OF THE INVENTION

It is, therefore, an object of the present invention to provide a cross-linkable nylon composition for coating of sewing threads.

It is another object of the present invention to provide a cross-linkable nylon composition that is readily adaptable to standard coating processes.

It is yet another object of the present invention to provide a cross-linkable nylon composition that has a controllable degree of cross-linking to accommodate various end use applications.

It is still another object of the present invention to provide sewing threads coated with the compositions disclosed herein.

It is yet another object of the present invention to provide a cross-linkable nylon composition that is not based on type 8 nylons and does not require cross-linking resins containing high levels of formaldehyde.

These and other objects together with the advantages thereof over the existing art, which shall become apparent from the specification which follows, are accomplished by the invention as hereinafter described and claimed.

In general, a cross-linking composition according to the present invention comprises a nylon terpolymer, from about 1 to 20 percent by weight of a low residual formaldehyde cross-linkable resin, based upon the weight of the terpolymer, from about 0.1 to 10 percent by weight of a catalyst for the cross-linkable resin, based upon the weight thereof, and a suitable solvent for the terpolymer in an amount sufficient to form at least a 5 percent solution by weight of the terpolymer.

A coated sewing thread is also provided comprising a sewing thread and from about 0.1 to 10 percent by weight of a cross-linked nylon composition, based upon the weight of the thread. The latter composition comprises a nylon terpolymer, from about 1 to 20 percent by weight of a low residual formaldehyde cross-linkable resin, based upon the weight of the terpolymer, from about 0.1 to 10 percent by weight of a catalyst for the cross-linkable resin, based upon the weight thereof, and a suitable solvent for the terpolymer in an amount sufficient to form at least a 5 percent solution by weight of the terpolymer.

PREFERRED EMBODIMENT FOR CARRYING OUT THE INVENTION

The present invention relates principally to a cross-linkable coating composition for multifilament nylon sewing thread. These compositions comprise a nylon terpolymer, a low residual formaldehyde cross-linkable resin and a mutual solvent. The terpolymer must be soluble in a lower alcohol. Suitable monomers for preparation of the terpolymers are selected from the group consisting of caprolactam, adipic acid, azelaic acid, sebacic acid, 1,10-decanedicarboxylic acid and hexamethylene diamine. Suitable terpolymers are based on the nylons selected from the group consisting of nylon 6, nylon 66, nylon 69, nylon 610 and nylon 612 and include 6/66/69; 6/66/610 and 6/66/612. In order to insure that the terpolymers are soluble in the lower alcohols, the ratios of the nylon components must be controlled within specific limits as set forth in Table I hereinbelow. All amounts are presented in percent by weight to total 100 percent.

TABLE I

| Terpolymer Compositions | | | |
|---|---|---|---|
| Possible Range | | Preferred Range | |
| 6/66/69 | | | |
| 6 | 35–55% | 6 | 45 ± 5% |
| 66 | 5–35% | 66 | 25 ± 5% |
| 69 | 20–55% | 69 | 30 ± 5% |
| 6/66/610 | | | |
| 6 | 30–75% | 6 | 45 ± 5% |
| 66 | 10–80% | 66 | 25 ± 5% |
| 610 | 10–80% | 610 | 30 ± 5% |
| 6/66/612 | | | |
| 6 | 30–75% | 6 | 45 ± 5% |
| 66 | 10–80% | 66 | 25 ± 5% |
| 612 | 10–80% | 612 | 30 ± 5% |

The cross-linkable resins are selected from the group consisting of low residual formaldehyde resins. By low residual is meant a formaldehyde content of less than 0.1 percent and one suitable low residual formaldehyde cross-linking resin is available from American Cyanamide under the trade name Cymel 1135.

Cross-linking of the coating composition can be initiated by using an acid catalyst such as para toluene sulfonic acid, citric or any of the other known organic acids which decompose at the processing temperatures, up to about 200° C., which include both the saturated and unsaturated types, monobasic, dibasic and tribasic acids and the like. Initiation takes place at an elevated temperature, that is, from about 80° to 200° C., with 150° C. being preferred.

In order to prepare the coating compositions of the present invention, the nylon terpolymer must be dissolved in a solvent. Solvation is conveniently performed in an organic solvent which is a co-solvent for the cross-linkable resin. Suitable solvents include the lower alcohols, such as methanol, ethanol, 1-propanol, 2-propanol and the like. Additionally, other solvents that may be employed include 2-butanol, s-butyl alcohol, t-butyl alcohol, and the like; glycols, such as ethylene glycol, 1,2-propanediol, 1,3-propanediol, and 1,4-butanediol; glycol ethers, such as diethylene glycol, triethylene glycol, dipropylene glycol, 2-methoxyethanol, 2-ethoxyethanol, and the like; ethers, such as tetrahydrofuran (THF), 1,4-dioxane, 1,3-dioxane, dimethoxyethane, and the like; and such other solvents as N,N-dimethylformamide, N,N-dimethylacetamide, dimethylsulfoxide, 2-methoxyethyl acetate, 2-ethoxyethyl acetate, and the like; and mixtures thereof. Preferred solvents include methanol, ethanol, and isopropanol.

The composition is prepared by dissolving the nylon terpolymer in a suitable solvent to form a solution comprising from at least about 5 percent to 20 percent by weight of nylon terpolymer, with a 10 to 15 percent solution being preferred. The low residual formaldehyde cross-linkable resin is added at a level of from about 1 to 20 percent by weight, based upon the weight of the terpolymer, with 10 percent being preferred. The catalyst for the resin is added at a level of from about 0.1 to 10 percent by weight, based upon the weight of the cross-linkable resin with 2 percent being preferred.

After the terpolymer solution is formed, the cross-linkable resin is added with stirring at 60° C. for about 10 minutes. The solution and resin are then cooled and the catalyst is next added at room temperature for 10 minutes and the composition is then ready for use.

As noted hereinabove, the cross-linkable nylon compositions of the present invention have utility in thread coating applications. Threads that may be coated are derived from polymers and include nylons, polyesters, and acrylics. These threads may be monofilament, multifilament, plied monofilament, or monochord and can be substantially any known or useful denier. Multifilament sewing thread includes threads having two or more filaments held together such as by twisting. Monochord sewing thread is composed of a single bundle of individual monofilament strands. The bundle of filaments has a slight twist and is held together with the coating. Monochord is distinguished from plied yarn which consists of two or more twisted bundles which are in turn plied together to form a larger thread. The term "thread" is intended to include a continuous strand of any size which is suitable for sewing and which may be constructed of one or more plies. Thus this term in appropriate cases may include yarn, string, cord, rope and the like. The coating is applied in a suitable fashion to provide a layer comprising from about 0.1 to 20 percent by weight, based upon the weight of the thread with about 3 to 10 percent by weight being preferred.

In thread coating applications, the coating step is carried out by passing the thread through the coating solution. Any excess solution is removed from the thread by passing it through an orifice or between pads. By controlling the orifice size or the pressure on the pads, the amount of coating pick-up can be controlled. Generally a coating pick-up of 5 percent to 10 percent is considered suitable. In addition to controlling the coating pick-up, running the line through an orifice or between pressure pads provides better penetration of the coating solution into the thread.

After the excess coating solution has been removed, the thread is passed through a heated area, between 80° to 150° C., where the solvent is removed from the solution. When the solvent has been removed, the coated thread may be passed through a second heated area where it is stretched or heat stabilized.

Cross-linking of the coating and bonding to the substrate occurs when the solvent is removed and the temperature of the coating is high enough to initiate the catalyst. This will generally occur within a range of about 80° to 150° C. The degree of cross-linking and the rate of cross-linking depend on the concentration of cross-linking resin, the catalyst level and the temperature.

The following examples are presented for the purpose of illustrating the invention disclosed herein in greater detail. The examples are not, however, to be construed as limiting the invention herein in any manner, the scope of which is defined by the appended claims.

EXAMPLES

The thread coated was nylon monochord, described hereinabove. The coating was applied by passing the thread through a dip tank containing the coating solution and removing any excess solution on the thread by passing the thread through a pair of felt pads or through a sizing hole. After coating, the thread was passed through an oven or series of ovens at a temperature and speed sufficient to remove the solvent. The lines were then weighed to determine the resin pick-up and extracted with boiling solvent to determine the degree of cross-linking.

The terpolymer used in these examples was type 651 (6/66/610) manufactured by Shakespeare Company, the Assignee of record herein. The formaldehyde-free cross-linking resin used in these examples was Cymel 1135, manufactured by American Cyanamide.

EXAMPLE 1

A coating solution was prepared by dissolving a nylon terpolymer (6/66/610) in ethanol to make a 10% solution by weight of terpolymer in ethanol. To this solution was added the cross-linking resin, Cymel 1135, at a level of 10% based on the terpolymer weight. A catalyst, para-toluene sulfonic acid was added to the solution at a level of 10%, based on the weight of the Cymel 1135 resin. The coated line was extracted in boiling ethanol without removing the material. It was concluded that the coating was cross-linked.

EXAMPLE 2

A 15% solution of nylon terpolymer (6/66/610) in methanol was prepared. To this solution was added the Cymel 1135 resin at a 10% level based on the terpolymer. Para-toluene sulfonic acid was added to a level of 10% based on the Cymel 1135 resin.

The terpolymer solution was used to coat nylon monochord thread, as in Example 1. The sewing thread was passed through the terpolymer solution and the excess solution was removed from the thread by passing the thread between pads. The pressure on the pads was controlled so that the coating pick-up was 3% based on the weight of the thread. An extraction of the coated thread with boiling methanol indicated that the coating was cross-linked.

EXAMPLE 3

The conditions of Example 2 were repeated with the exception that the pressure on the pad was adjusted so that the coating pick-up was increased to 6% based on the weight of the thread. Extraction tests indicated that the coating had cross-linked. Sewing tests with the coated thread indicated that the coating was well bonded to the nylon substrate and that the bulk strength of the coating was sufficient to withstand the sewing without causing the line to fibrillate.

EXAMPLE 4

A coating solution was prepared as described in Example 3. Nylon monochord thread was coated by passing the line through the coating solution. The excess solution was removed by passing the thread through felt pads. The coated thread was then passed through three ovens, each 10 feet (3M) long. The oven temperatures were 210° C., 221° C. and 221° C., respectively. The speed of the thread was 60 feet (18.3M) per minute. The coating pick-up was found by weight to be 5.6%. Extraction of the coated thread with boiling methanol indicated that the coating was cross-linked.

EXAMPLE 5

An 8% solution of nylon terpolymer (6/66/610) in methanol was prepared. To this solution was added the Cymel 1135 resin at a 10% level based on the terpolymer. Para-toluene sulfonic acid was added at a level of 10% based on the weight of the Cymel 1135 resin. The coating conditions and material coated were the same as described in Example 4. The coating pick-up was found to be 4.3%. Extraction of the coated thread with boiling methanol indicated that the coating was cross-linked.

Thus, it should be clear from the foregoing examples and specification disclosure that the compositions of the present invention are cross-linkable and that they are useful for coating threads.

It is to be understood that the use of nylon terpolymers and cross-linkable resins is not limited to the specific polymers and resins exemplified herein or by the disclosure of typical polymers and resins provided herein, the examples having been provided merely to demonstrate practice of the subject invention. Those skilled in the art may readily select other terpolymers and low residual formaldehyde cross-linkable resins according to the disclosure made hereinabove. Nor, should practice of the invention be limited to coating nylon monochord, it being understood first, that other threads such as the polyesters could be substituted and second, that the composition has utility in applications other than thread coating.

Similarly, practice of the process of the present invention should not be limited to any particular process conditions from the exemplification it being understood by those skilled in the art that accommodations can be made within the spirit of the invention for differences in equipment as well as in the desired composition and physical properties of the coated thread.

Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. A cross-linkable nylon coating solution composition for sewing threads comprising:

a nylon terpolymer;

from about 1 to 20 percent by weight of a melamine formaldehyde resin, based upon the weight of said terpolymer;

said resin containing less than about 0.1 percent by weight of formaldehyde based upon the weight of said resin;

from about 0.1 to 10 percent by weight of a catalyst for said melamine formaldehyde resin, based upon the weight thereof; and a suitable solvent for said terpolymer in an amount sufficient to form at least a 5 percent solution by weight of said terpolymer.

2. A cross-linkable nylon composition, as set forth in claim 1, wherein said nylon terpolymer comprises nylon 6, nylon 66 and nylon 610.

3. A cross-linkable nylon composition, as set forth in claim 1, wherein said nylon terpolymer comprises nylon 6, nylon 66 and nylon 69.

4. A cross-linkable nylon composition, as set forth in claim 1, wherein said terpolymer comprises nylon 6, nylon 66, and nylon 612.

5. A cross-linkable nylon composition, as set forth in claim 1, wherein said melamine formaldehyde resin is present in an amount of 10 percent by weight, based upon the weight of said terpolymer.

6. A cross-linkable nylon composition, as set forth in claim 1, wherein said catalyst is para-toluene sulfonic acid and is present in an amount of 10 percent by weight, based upon the weight of said melamine folmaldehyde resin.

* * * * *